(12) United States Patent
Shimizu

(10) Patent No.: US 7,907,834 B2
(45) Date of Patent: Mar. 15, 2011

(54) IMAGE PROCESSING APPARATUS AND IMAGE PROCESSING METHOD

(75) Inventor: Tetsuya Shimizu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1400 days.

(21) Appl. No.: 09/836,838

(22) Filed: Apr. 18, 2001

(65) Prior Publication Data

US 2001/0046367 A1    Nov. 29, 2001

(30) Foreign Application Priority Data

Apr. 20, 2000  (JP) .................. 2000/119026
Apr. 17, 2001  (JP) .................. 2001/118427

(51) Int. Cl.
*H04N 5/93* (2006.01)

(52) U.S. Cl. .................. 386/353; 386/354; 386/355

(58) Field of Classification Search .................. 386/46, 386/1, 96, 94, 95, 125, 126; 348/565, 555, 348/563, 564; 360/18; 369/47.1, 47.21; 725/90, 87, 40, 43; 358/302; 345/60, 63, 345/89

See application file for complete search history.

(56) References Cited

U.S. PATENT DOCUMENTS

| | | | | | |
|---|---|---|---|---|---|
| 5,633,723 | A | * | 5/1997 | Sugiyama et al. | 358/296 |
| 5,974,018 | A | * | 10/1999 | Takenaka | 369/84 |
| 6,025,818 | A | * | 2/2000 | Okano | 345/63 |
| 6,249,265 | B1 | * | 6/2001 | Tajima et al. | 345/63 |
| 6,285,408 | B1 | * | 9/2001 | Choi et al. | 348/555 |
| 6,385,771 | B1 | * | 5/2002 | Gordon | 725/90 |
| 6,510,553 | B1 | * | 1/2003 | Hazra | 725/87 |
| 6,694,087 | B1 | * | 2/2004 | Weaver | 386/52 |
| 6,711,181 | B1 | * | 3/2004 | Xue et al. | 370/504 |
| 6,825,948 | B1 | * | 11/2004 | Hayashi et al. | 358/1.18 |
| 6,973,669 | B2 | * | 12/2005 | Daniels | 725/112 |

* cited by examiner

*Primary Examiner* — Jamie Atala
(74) *Attorney, Agent, or Firm* — Cowan, Liebowitz & Latman, P.C.

(57) ABSTRACT

An image processing apparatus includes a reception unit, a decoding unit, a sub frame generating unit and an image signal generating unit. The reception unit receives at least three encoded image data via a serial bus. The decoding unit decodes one of the received encoded image data to generate a main frame. The sub frame generating unit extracts low frequency component from each one of the other received encoded image data, and generates sub frames from the extracted low frequency components. The image signal generating unit combines the main frame and the sub frames, and generates an image signal including the main frame combined with the sub frames.

4 Claims, 2 Drawing Sheets

IMAGE PROCESSING APPARATUS AND IMAGE PROCESSING METHOD

BACKGROUND OF THE INVENTION

1. Field of the Invention

The present invention relates to a system for receiving plural digital images in an encoded state and displaying the plural images in a same frame.

2. Related Background Art

Recently there are developed technologies of transmitting and receiving digital image data, encoded and recorded in a recording medium, in such encoded state. One of the standards realizing such technologies is the IEEE1394-1995 standard.

The IEEE1394-1995 standard is one of the standards realizing a high performance serial bus, and is provided with a transfer method called isochronous transfer method. The isochronous transfer method guarantees data transfer of a predetermined size for each communication cycle (one communication cycle being about 125 μsec, and is suitable for transmission and reception of data for which the real time character is important, such as image data or audio data. Also the isochronous transfer method does not specify the designation. Therefore, a packet transferred by the isochronous transfer method (hereinafter called isochronous packet) from a node is broadcast over the entire serial bus. The isochronous packets transferred from plural nodes are managed by channel numbers 0 to 63. Also the isochronous packets transferred from the plural nodes are broadcast on time-shared basis in every communication cycles.

The DV standard defined by the HD Digital VCR Conference takes the isochronous transfer method of the IEEE1394-1995 standard into consideration and adopts the IEEE1394-1995 standard for the digital interface of the digital video cassette recorder.

However, in a system for receiving the plural digital image data in encoded state through a digital interface based on the IEEE1394-1995 standard and displaying such plural images on a same image frame, the conventional configuration requires plural decoders and plural frame memories in parallel. There are associated drawbacks of a larger hardware of the system and a higher manufacturing cost thereof.

SUMMARY OF THE INVENTION

In consideration of the foregoing, the object of the present invention is to provide an image processing apparatus and an image processing method not requiring plural decoders or plural frame memories even in case of receiving the plural digital image data in encoded state and displaying these images on a same frame.

The above-mentioned object can be attained, according to a preferred embodiment of the present invention, by an image processing apparatus comprising:

reception means for receiving plural image data;

main frame generation means for decoding one of the plural image data to generate a main frame;

sub frame generation means for extracting a low frequency component from one of the plural image data to generate a sub frame; and output means for outputting an image signal including the main frame and the sub frame.

According to another embodiment of the present invention, there is also provided an image processing method comprising steps of:

receiving plural image data;

decoding one of the plural image data to generate a main frame;

extracting a low frequency component from one of the plural image data to generate a sub frame; and outputting an image signal including the main frame and the sub frame.

Other objects of the present invention, and the advantages thereof, will become fully apparent from the following detailed description of the embodiments.

DESCRIPTION OF THE PREFERRED EMBODIMENTS

The preferred embodiments of the present invention will now be described in detail hereinafter with reference to the accompanying drawings.

Figure 1:
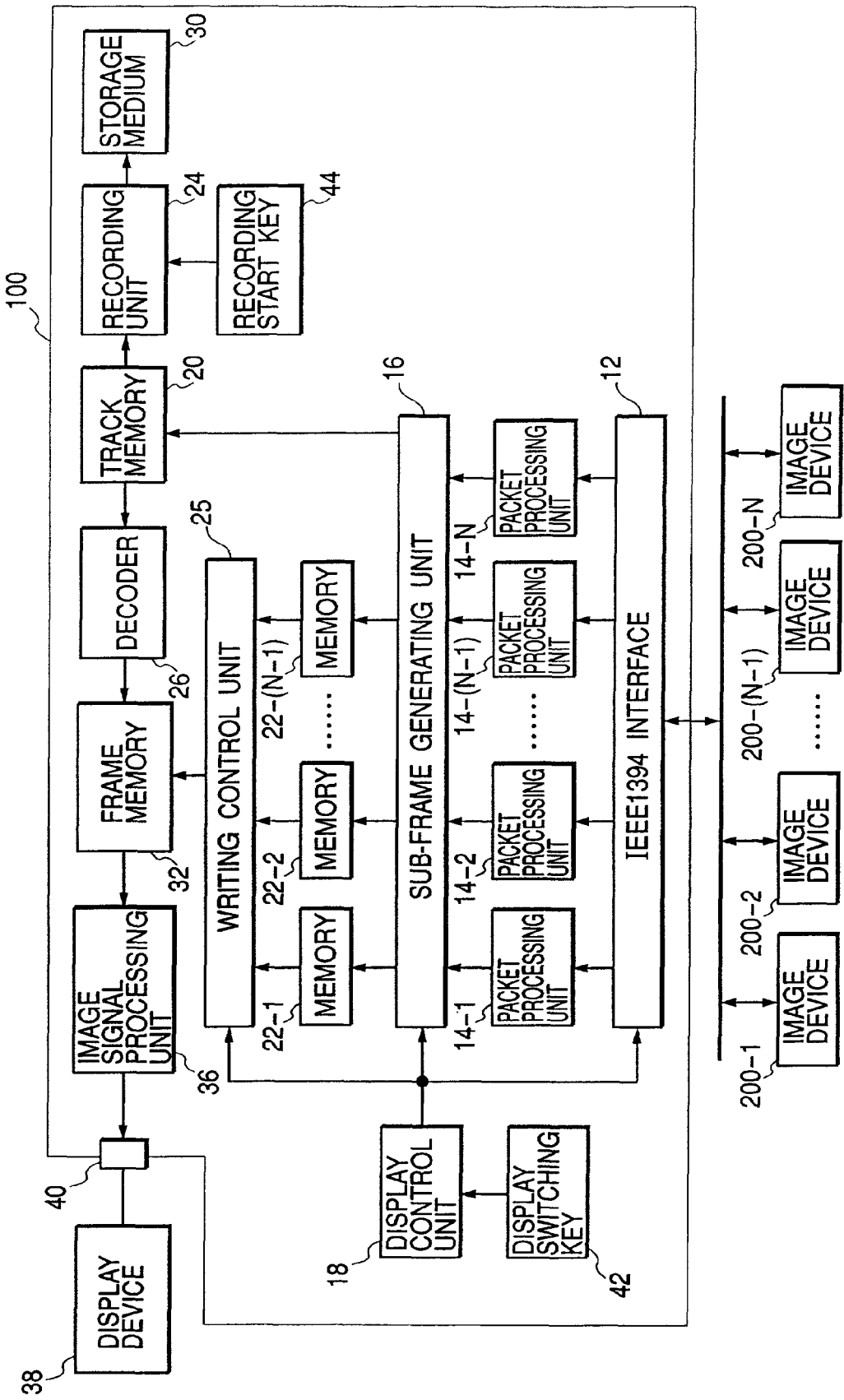
FIG. 1 is a block diagram showing the principal configuration of an image recording apparatus 100 embodying the present invention.
Figure 2:
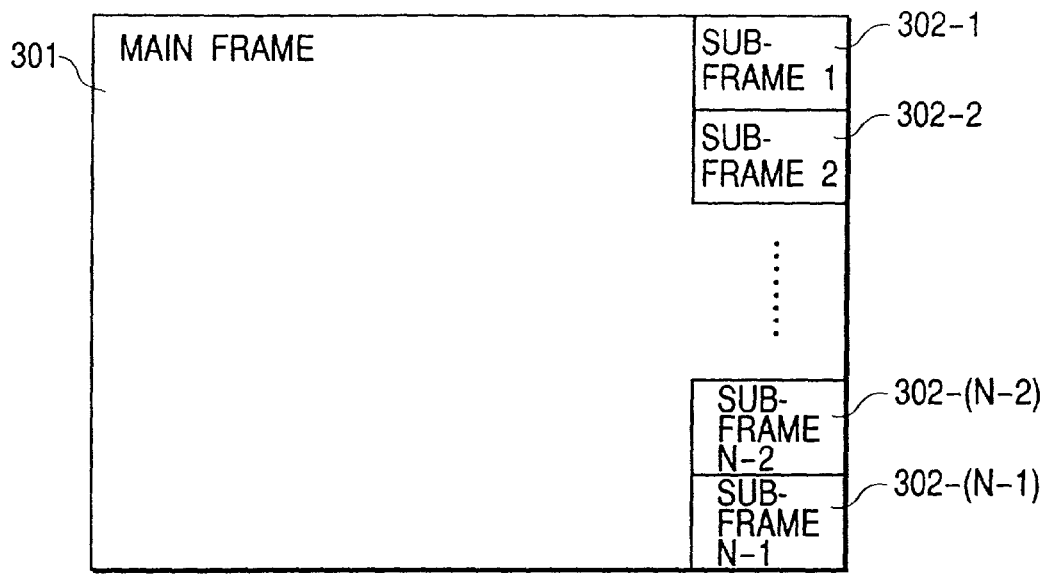
FIG. 2 is a view showing an example of a display frame generated by the image recording apparatus 100 embodying the present invention.
Figure 3:
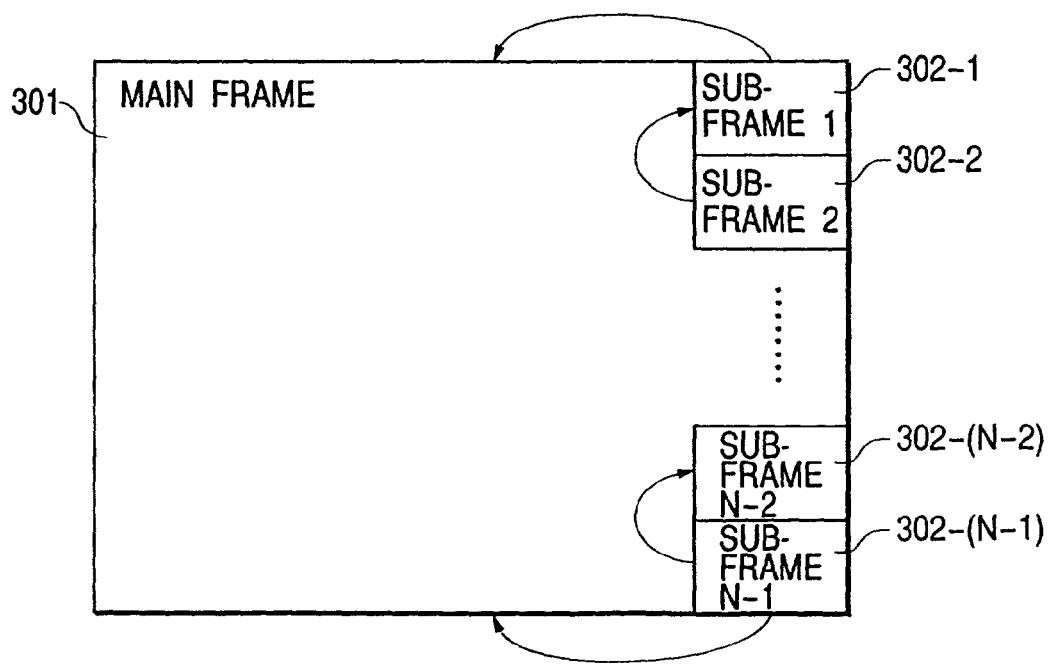
FIG. 3 is a view showing a procedure of switching images displayed by a main frame 301 and sub frames 302-1 to 302-(N−1).

FIG. 1 is a view showing the principal configuration of an image recording apparatus 100 embodying the present invention, and FIG. 2 is a view showing an example of the display image frame generated by the image recording apparatus 100 embodying the present invention.

Image devices 200-1 to 200-N (N is two or more integer), after acquiring channel numbers and bands required for isochronous transfer, generate plural isochronous packets including digital image data according to the SD format of the DV standard (such data being hereinafter called SD data) and transmit each isochronous packet in each communication cycle (about 125 μsec) to the image recording apparatus 100.

Serial bus 10 is a serial bus based on IEE1394-1995 standard. An IEEE1394 interface 12, based on the IEEE1394-1995 standard, receives an isochronous packet transmitted in each communication cycle from the image device 200-1 to 200-N, and sends such packets respectively to isochronous packet processing units 14-1 to 14-N. Each of the isochronous packet processing units 14-1 to 14-N extracts SD data from each isochronous packet and sends such data to a sub frame generation unit 16.

The sub frame generation unit 16 selects an isochronous packet processing unit 14-x (x being one of 1 to N) according to an instruction from a display control unit 18, and writes the SD data, outputted from such selected unit, into a track memory 20. Also the sub frame generation unit 16 extracts the DC components of digital image data from SD data outputted from the isochronous packet processing units 14-1 to 14-N (excluding the isochronous packet processing unit 14-x), and generates sub frames 302-1 to 302-(N−1) utilizing thus extracted components. In the SD format of the DV standard, the DC component can be easily extracted since the DC components of the luminance data and the color difference data are positioned in predetermined data areas. The sub frames 302-1 to 302-(N−1) generated in the sub frame generation unit 16 are written in memories 22-1 to 22-(N−1).

A decoder 26 entirely decodes the SD data read from the track memory 20, thereby generating a main frame 301 as shown in FIG. 2. The main frame memory 301 generated by the decoder 26 is written into a frame memory 32.

A writing control unit 304 reads the sub frames 302-1 to 302-N from the memories 22-1 to 22-(N−1) respectively and overwrites such sub frames on a main frame 301 stored by frame memory 32. In addition, each of such sub frames 302-1 to 302-(N−1) is overwritten into predetermined memory areas (at the right hand side of the main frame 301 in the present embodiment) on the main frame 301. The position or size of the sub frames 302-1 to 302-(N−1) may be altered by the writing control unit 304 by changing the position or size of the memory areas corresponding to the sub frames 302-1 to 302-(N−1).

An image processing unit 36 reads digital image data (including the main frame 301 and sub frames 302-1 to 302-(N−1)) of a frame from the frame memory 32 for each frame and converts the image data into an analog image signal. The analog image signal generated in the image processing unit 36 is outputted to the exterior through an image output terminal 40. A display device 38 enters and displays the analog image signal outputted from the image output terminal 40. Thus, on the display device 38, the digital image data transmitted from one of the plural image devices 200-1 to 200-N is displayed in a large scale on the main frame 301 and the digital image data transmitted from other image devices are displayed in the sub frames 302-1 to 302-(N−1) smaller than the main frame 301.

In case of switching the image displayed on the main frame 301, the user instructs the switching of the display by rotating a display switching key 42 by a predetermined amount. In response to the rotation of the display switching key 42 by the predetermined amount, the display control unit 18 controls the sub frame generation unit 16 in such a manner as to switch the images displayed on the main frame 301 and the sub frames 302-1 to 302-(N−1). For example, whenever the display switching key 42 is rotated to left side, the display control unit 18 controls display as follows. The switching is so executed as to display the image, which has been displayed on the main frame 301, in the sub frame 302-(N−1), to display the image, which has been displayed on the sub frame 302-1, on the main frame 301, and to display the image, which has been displayed in the sub frame 302-2, in the sub frame 302-1. On the other hand, whenever the display switching key 42 is rotated right side, the display control unit 18 controls the switching as to display the image, which has been displayed on the main frame 301, in the sub frame 302-1 and to display the image, which has been displayed on the sub frame 302-(N−1), in the main frame 301.

In case an image is to be recorded, the user rotates the display switching key 42 until the image to be recorded is displayed on the main frame 301. After the image to be recorded is displayed on the main frame 301, the user instructs the start of recording by depressing a recording start key 44. In response to the depression of the recording start key 44, a recording unit 24 records the SD data, held in the track memory 20, on a recording medium 30, which can for example be a magnetic tape, a magnetic disk, a hard disk, a semiconductor memory or the like.

As explained in the foregoing, the image recording apparatus 100 of the present embodiment does not require plural decoders nor plural frame memories even in case of receiving plural digital image data in the encoded state and displaying such digital image data on a same frame, thereby enabling simplification of the circuit configuration, reduction in the manufacturing cost and reduction in the electric power consumption.

Also the image recording apparatus 100 of the present embodiment allows to simply select the image to be recorded, since the recording of the image displayed on the main frame 301 can be started by merely depressing the recording start key 33 and also since the image displayed on the main frame 301 can be switched by merely rotating the display switching key 42.

The invention may be embodied in other specific forms without departing from essential characteristics thereof.

In the forgoing embodiment, there has been explained a case of handling the digital image data encoded according to the SD format of the DV standard, but the present invention is not limited to such case. It is likewise applicable to the digital image data encoded according to the SDL format or HD format of the DV standard, or according to the Motion JPEG-2000 standard.

Also in the foregoing embodiment, there has been explained a case where the sub frames are arranged at the right hand side of the main frame, but the present invention is not limited to such case. It is likewise applicable to a case where the sub frames are arranged in positioned not at the right hand side of the main frame (for example at the lower side thereof), or a case where the sub frames are provided in positioned designated in advance by the user.

Also in the foregoing embodiment, there has been explained a case where the image recording apparatus 100 and the image devices 200-1 to 200-N are connected through a digital interface based on the IEEE1394-1995 standard, but the present invention is not limited to such case. It is likewise applicable to a case where the image recording apparatus 100 and the image device 200-1 to 200-N are connected through a digital interface based on an expansion of the IEEE1394-1995 standard (for example IEEE1394a-2000 standard or IEEE1394.b standard).

Also in the foregoing embodiment, there has been explained a case where the display switching key 42 and the recording start key 44 are provided separately, but the present invention is not limited to such case and is likewise applicable to a case where the display switching key 42 and the recording start key 44 are formed integrally.

Moreover, in this embodiments, the case where the sub frames 302-1 to 302-(N−1) are generated only using DC component is explained. However, the present invention is not restricted to this case. It is possible to apply to the case where the sub frames 301-1 to 302-(N−1) are generated using a part of DC component and AC component.

Therefore, the above-mentioned embodiments are merely examples in all respects, and must not be construed to limit the invention.

The scope of the present invention is defined by the scope of the appended claims, and is not limited at all by the specific description of this specification. Furthermore, all the modifications and changes belonging to equivalents of the claims are considered to fall within the scope of the present invention.

What is claimed is:
1. An image processing apparatus comprising:
a reception unit that receives first, second, and third encoded image data;
a decoding unit that decodes the first encoded image data to generate a main frame;
a sub frame generating unit that extracts a low frequency component from the second encoded image data, extracts a low frequency component from the third encoded image data, generates a first sub frame from the low frequency component of the second encoded image data, and generates a second sub frame from the low frequency component extracted from the third encoded image data; and an image signal generating unit that combines the main frame generated from the first encoded image data, the first sub frame generated from the low frequency component of the second encoded image data, and the second sub frame generated from the low frequency component of the third encoded image data, and generates an image signal including the main frame generated from the first encoded image data, the first sub frame generated from the low frequency component of the second encoded image data, and the second sub frame generated from the low frequency component of the third encoded image data; and wherein if a switching key is rotated to left side, (a) the decoding unit decodes the second encoded image data to generate the main frame, (b) the sub frame generating unit extracts the low frequency component from the third encoded image data, extracts a low frequency component from the first encoded image data, generates the first sub frame from the low frequency component extracted from the third encoded image data, and generates the second sub frame from the low frequency component extracted from the first encoded image data, and (c) the image signal generating unit combines the main frame generated from the second encoded image data, the first sub frame generated from the low frequency component of the third encoded image data, and the second sub frame generated from the low frequency component of the first encoded image data, and generates an image signal including the main frame generated from the second encoded image data, the first sub frame generated from the low frequency component of the third encoded image data, and the second sub frame generated from the low frequency component of the first encoded image data, and wherein if the switching key is rotated to right side, (a) the decoding unit decodes the third encoded image data to generate the main frame, (b) the sub frame generating unit extracts the low frequency component from the first encoded image data, extracts the low frequency component from the second encoded image data, generates the first sub frame from the low frequency component extracted from the first encoded image data, and generates the second sub frame from the low frequency component extracted from the second encoded image data, and (c) the image signal generating unit combines the main frame generated from the third encoded image data, the first sub frame generated from the low frequency component of the first encoded image data, and the second sub frame generated from the low frequency component of the second encoded image data, and generates an image signal including the main frame generated from the third encoded image data, the first sub frame generated from the low frequency component of the first encoded image data, and the second sub frame generated from the low frequency component of the second encoded image data.

2. The image processing apparatus according to claim 1, wherein the reception unit is based on the IEEE 1394-1995 standard.

3. The image processing apparatus according to claim 1, further comprising:

a recording unit adapted to record the encoded image data corresponding to the main frame on a storage medium, in response to an operation of a predetermined operation key.

4. The image processing apparatus according to claim 1, wherein the at least three encoded image data are based on the SD format of the DV standard.

* * * * *